Aug. 30, 1932.                S. F. OSSING                1,874,600
PORTABLE UNLOADING MACHINE
Filed July 25, 1929
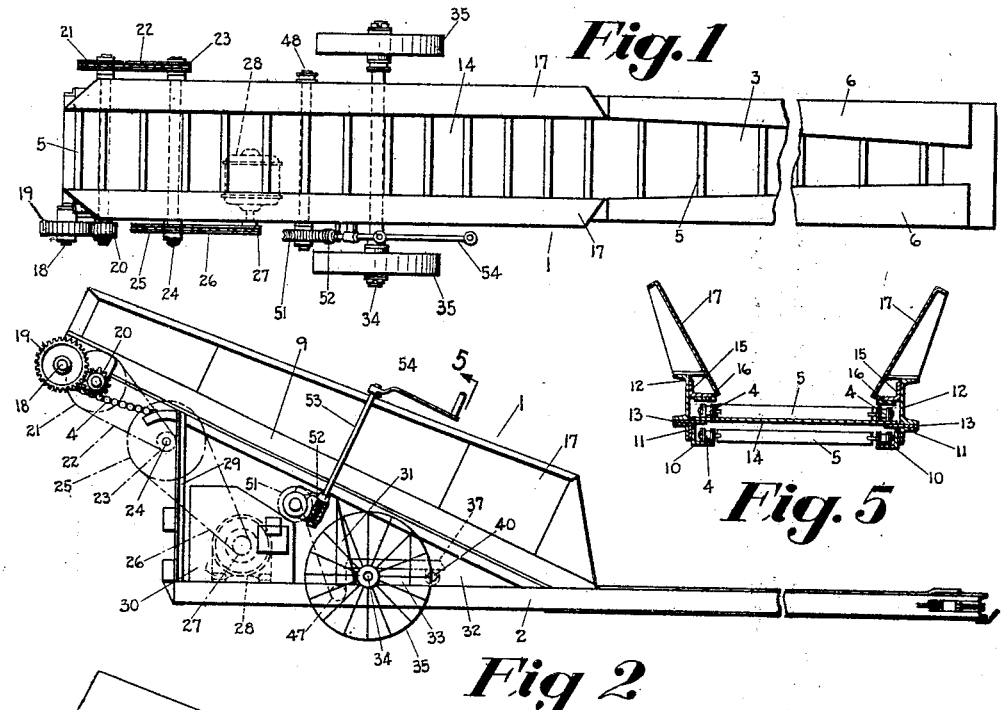
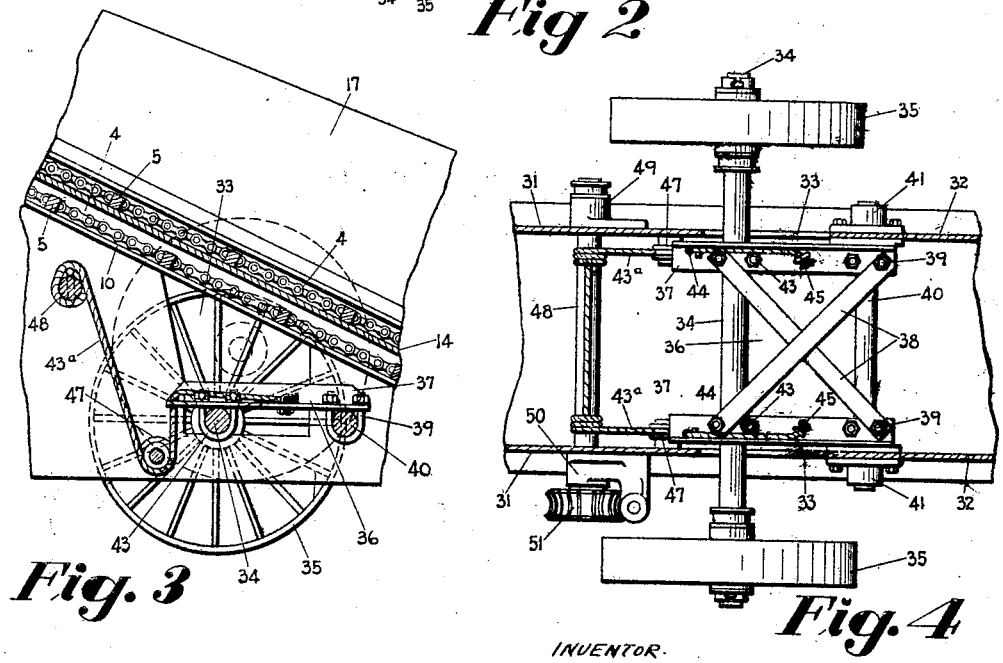
INVENTOR.
Stanley P. Ossing.
By Cushman, Bryant & Darby
attys.

Patented Aug. 30, 1932

1,874,600

UNITED STATES PATENT OFFICE

STANLEY F. OSSING, OF COLUMBUS, OHIO, ASSIGNOR TO THE JEFFREY MANUFACTURING COMPANY, OF COLUMBUS, OHIO, A CORPORATION OF OHIO

PORTABLE UNLOADING MACHINE

Application filed July 25, 1929. Serial No. 380,946.

This invention relates to new and useful improvements in portable conveyors.

More particularly, the invention relates to portable conveyors which are employed for unloading coal cars having dumping bottoms, and is equipped with a relatively thin conveyor section which is adapted to rest horizontally upon the rails of a track beneath the discharge hopper of a coal car. These conveyors are equipped with an inclined conveyor section adapted to elevate the material and discharge it either into wagons, bins, piles or the like. At some places, particularly coal yards, railway tracks are about on the same level with the ground and, under such circumstances, it is essential that the conveyor frame, carried by a pair of transporting wheels, be lowered so as to rest directly upon the ground in order to dispose the loading end of the conveyor horizontally. In other cases, the railway tracks are disposed a distance above the ground, in which event it is desirable that the horizontal section of the conveyor be maintained substantially horizontal and, in order to provide for this, it becomes necessary to support the conveyor frame a distance above the ground by means of the wheels. It, therefore, is important to equip such conveyors with vertically adjustable means to enable the conveyor to meet these varying conditions, as well as to provide for varying the elevation of the discharge end of the conveyor.

Accordingly, it is the primary object of this invention to provide conveyors of this general type with means for quickly and easily adjusting the wheels vertically relative to the frame of the machine with simple and reliable mechanism.

Another object of the invention is to provide strong and durable means for vertically adjusting the wheels and retaining them in the desired adjustment; said means being disposed beneath the inclined section of the conveyor so as to be protected against damage and the accumulation of dust and dirt from the material being handled.

Other objects and advantages of the invention will become apparent during the course of the following description.

In the accompanying drawing forming a part of the application and wherein like numerals are employed to designate like parts throughout the several views:

Fig. 1 is a top plan of the transportable conveyor.

Fig. 2 is a side elevation thereof.

Fig. 3 is an enlarged fragmentary longitudinal section through the center of the conveyor illustrating the means for raising and lowering the wheels.

Fig. 4 is a similar horizontal section through the same, and

Fig. 5 is a transverse section through the inclined portion of the conveyor trough.

Referring now more particularly to the drawing, the numeral 1 designates the portable conveyor in its entirety having a frame composed of a pair of spaced parallel side rails 2 formed of channel beams, or any other desired formation with a bottom plate 3 connecting the same to constitute a trough. A false bottom, not shown, is spaced from the bottom plate between the side rails to define a passage between these two bottoms for the passage of the lower run of an endless conveyor 4 composed of a pair of chains having transverse material engaging flights 5 connecting the same. This portable conveyor is of practically the same construction as that disclosed in the pending application of Liggett, Serial No. 644,169. The forward end of the horizontal section of the conveyor is adapted to rest crosswise upon the railroad tracks beneath a coal car hopper and to provide for relieving the endless conveyor from the bulk of the weight of material where it is discharged thereon. A pair of horizontally disposed plates 6 are secured to the side rails 2 to overhang the longitudinal edges of the horizontal section of the endless conveyor, with their longitudinal edges arranged in rearwardly diverging relationship, as shown in Fig. 1, and as fully explained in Liggett's copending application above identified. A plate 7 extends transversely of the machine and is secured to the forward or loading end of the conveyor and has an upturned forward edge to prevent the end of the conveyor frame from catching on the track or other obstacles when it is placed beneath the car. A foot shaft for the conveyor, not shown, is journalled transversely through the forward ends of the side rails 2, and is equipped with suitable take-up means for controlling the tension of the endless conveyor.

In order to provide the portable conveyor with an inclined trough for the elevation of material being handled, inclined side rails 9 are secured to the horizontal side rails 2 at a point approximately midway their length to incline upwardly and rearwardly as shown. These side rails 9, as illustrated in Fig. 5, are composed of a pair of angle beams 10 having upstanding flanges, to which are bolted or otherwise secured angle bars 11 having flanges disposed horizontally, as shown. Above the angle bars 11 are positioned channel beams 12 disposed on their sides so that their lower flanges can be bolted or riveted to the angle bars 11 with supporting plates 13 secured therebetween. These supporting plates 13 support a bottom plate 14 for the inclined section of the endless conveyor and divide the trough of the conveyor into a pair of ways, the uppermost receiving the upgoing run of the endless conveyor and the lower receiving the returning run. Angle beams 15 are secured to the channel beams 12 with flanges arranged parallel to and overlapping the bottom plate 14, and wear plates 16 are secured to the horizontal flanges to take the wear imposed by the contact of the endless conveyor. These wear plates overhang the upper way of the inclined conveyor trough, as shown, and outwardly and upwardly diverging guard plates 17 are secured to the upper flanges of the channel beams 12 for confining the transported material to the trough and for preventing spillage thereof. The bottom plate 14 of the inclined section of the conveyor frame may be separate from, or a continuation of the false bottom of the horizontal section of the frame to provide for smooth sliding of the endless conveyor from the horizontal to the inclined section of the machine.

The endless conveyor 4, at the discharge end of the conveyor, passes around sprockets secured to a head shaft 18 which is driven from a motor at a reduced speed by reduction gearing composed of a spur gear 19 secured to the head shaft and meshing with a pinion 20 secured to a counter-shaft extending transversely beneath the inclined section of the conveyor. This counter-shaft is driven by means of a relatively large sprocket 21 propelled by a sprocket chain 22 trained about a relatively small sprocket 23 mounted on one end of a second counter-shaft 24, the other end of which has secured thereto a relatively large sprocket 25 propelled by a sprocket chain 26 driven from a relatively smaller sprocket 27 mounted upon the armature shaft of a prime mover 28 supported upon a platform sustained upon the rear ends of the side rails 2 directly beneath the inclined section of the conveyor. Any suitable control mechanism may be employed for operating and controlling the prime mover. The unloading end of the inclined section of the conveyor frame is braced from the rear end of the horizontal frame 2 by means of suitable uprights 29, which form the supports of bearings for the counter-shaft 24. A housing 30 is provided for the prime mover, if desired. The rear extensions of the side rails 2 and the inclined rails 9 are connected at their sides by side plates 31 and 32, it being noted that these side plates are spaced apart to provide an opening 33 through the frame at substantially its center of gravity.

To render the machine portable and adjustable vertically to elevate the discharge end thereof by fulcruming upon the forward ends of the horizontal bars 2, an axle 34 extends transversely through the frame and openings 33 above the side rails 2, as clearly shown. Ground engaging wheels 35 are mounted upon the extended ends of the axle at the sides of the machine, as shown. This axle is peculiarly connected with the frame in a manner enabling the ground engaging wheels to be adjusted vertically so that the conveyor frame can be adjusted to different elevations or permitted to rest directly upon the ground. For this purpose, a lever or axle frame 36 is provided and, as shown best in Fig. 4, is composed of a pair of spaced parallel side angle bars 37 connected in spaced relation by a pair of diagonal cross-braces 38. One end of this frame 36 is pivotally connected to the frame of the machine by shackle bolts 39 secured thereto and tightly embracing a rotatable shaft 40 journalled in bearings 41 secured to the side plates 32. Thus, the axle frame 36 rests upon and is secured to the upper surface of the shaft 40 and may swing in an arc vertically of the machine. The other end of this frame 36 rests on top of the axle 34, and is rigidly connected thereto by shackle bolts 43. Consequently, in its lowermost position, the axle 34 is held engaged with the side rails 2, as shown in Fig. 3.

In order to raise and lower the axle 34 by swinging the frame 36 upon its axis, one or more flexible cables 43ª are secured to the free end of the frame 36 by passing through apertures 44 in the angle bars 37 to be disposed in the angles thereof and secured in position by suitable clips 45. To prevent the edges of the openings 44 from cutting the flexible cable, inwardly extending pins are welded to the horizontal flanges of the angle bars 37 adjacent these openings so that the cable will pass over these pins and be held more or less clear of the edges of the apertures.

From the axle frame 36, the cables 43 extend downwardly and are trained around sheaves or pulleys 47 mounted on the side rails 2 below the axis of the shaft 40. The cables are then directed upwardly as shown and wound upon a transversely extending shaft or drum 48 journalled in bearings 49 and 50 secured to the side plates 31. In this manner, it will be evident that the frame of the conveyor is, in effect, swung or suspended from the axle member. The cable 43ª in the present illustration is of a single length. The intermediate portion of this cable is extended along the shaft 48 with its two ends extended through transverse openings in the shaft adjacent its ends as shown in Figure 3, after which the portions of the cable adjacent its medial portion are wound about the shaft and then extended down around the guide shafts or pulleys 47 and thence upwardly and over the side bars of the axle frame where the two ends of the cable are attached as hereinbefore described.

The shaft 48 is extended through and beyond the bearing 50, and its extended end is equipped with a worm-wheel 51 which meshes with a worm 52 carried on one end of a substantially vertical shaft 53, also mounted in bearings formed upon the bearing 50. This shaft 53, as shown in Fig. 2, extends upwardly to a point slightly above the top of the inclined conveyor trough, and is there provided with a hand-crank 54 by which the shaft or drum 48 may be rotated in either direction. The worm and worm-wheel are of the self-locking type to prevent accidental rotation of the shaft 48 in either direction.

In operation and assuming the parts to be in the position shown in Figs. 2 and 3, and it is desired to lower the frame of the conveyor to rest upon the ground, or in other words to elevate the wheels to the dotted line position shown in Fig. 3, the crank 54 is operated to rotate the shaft or drum 48 in a clockwise direction to unwind and lengthen the cables 43ª, thereby permitting the axle frame 36 to swing upwardly upon its axis shaft 40, thereby elevating the axle 34 and wheels 35. During this operation, the weight of the machine will cause it to gravitate and rest upon the ground, or intermediate elevations of the frame may be attained by stopping rotation of the shaft or drum 48 at any point where the frame is to be maintained, due to the fact that the worm-gearing is self-locking. In order to elevate the discharge end of the conveyor frame the crank 54 is turned in the opposite direction to cause the drum or shaft 48 to rotate in a counter-clockwise direction to wind the cables 43ª thereon, thereby causing the axle frame 36 to swing downwardly and move the axle 34 and wheels 35 downwardly therewith to elevate the frame. The cables 43ª may thus be shortened until the axle 34 engages the side rails 2, where the wheels will be in their lowermost position with the rear end of the conveyor frame elevated a desired distance above the ground. In this condition, the portable conveyor may be readily rolled from place to place as the wheels are located approximately at the center of gravity of the machine to facilitate balancing the same in transportation. If desired, the forward end of the horizontal section of the conveyor frame may be equipped with rollers or casters, not shown, to take the weight of the forward end of the machine. Also, instead of employing an axle extending transversely of the frame, the wheels may be mounted upon the swinging frame 36 by means of stub axles or in any other desired manner. It will also be within the scope of this invention to employ any kind of ground engaging means other than wheels to effect vertical adjustments of the conveyor frame, wheels being employed in the present illustration of the invention because they also serve as means for transporting the conveyor.

It is to be understood that various changes in the arrangement and construction of the various parts may be resorted to without departing from the scope of the appended claims:

I claim:

1. A portable conveyor comprising a frame, conveyor mechanism supported on the frame, a wheeled axle extending transversely of the frame beneath the conveyor mechanism, means guiding the axle for relative vertical displacement of the frame, flexible draft means in connection with the axle and trained downwardly therefrom to engaging means on the frame, and means for tensioning the draft means to move the frame vertically relative to the axle.

2. A portable conveyor comprising a frame, conveyor mechanism supported on the frame, a wheeled axle extending transversely of the frame beneath the conveyor mechanism, means guiding the axle for relative vertical displacement of the frame, whereby the frame is movable from a position where it is supported on the wheels to a position in which it rests directly on the ground, flexible draft means in connection with the axle and trained downwardly therefrom to engaging means on the frame, and means for tensioning the draft means to move the frame vertically relative to the axle.

3. A portable conveyor comprising a frame, a lever pivoted at one end to the frame on a transverse axle, a wheeled axle carried by the free end of said lever, the axle being parallel to the axis of said lever, flexible draft means connected to the free end of said lever for supporting the same in horizontally extending position with the wheels projecting below the frame, the draft means being trained downwardly from the lever to engaging means on the frame, and means for elongating said draft means for lowering the frame relative to the axle.

4. A portable conveyor comprising a frame, a lever pivoted at one end to the frame on a transverse axle, a wheeled axle carried by the free end of said lever, the axle being parallel to the axis of said lever, flexible draft means connected to the free end of said lever for supporting the same in horizontally extending position with the wheels projecting below the frame, the draft means being trained downwardly from the lever to engaging means on the frame, and means for elongating said draft means for lowering the frame relative to the axle, the lever having a swinging range sufficient to enable the frame to be lowered into direct engagement with the ground.

5. A portable conveyor comprising a frame, conveying mechanism supported on the frame, a wheeled axle extending transversely of the frame beneath the conveying mechanism, means guiding the axle for relative vertical displacement of the frame, flexible draft means in connection with the axle and trained downwardly therefrom to engaging means on the frame and then upwardly, winding means engaging the upwardly trained portion of said draft means, and means operable to actuate said winding means.

In testimony whereof I have hereunto set my hand.

STANLEY F. OSSING.